Oct. 11, 1932.  H. H. PAYZANT  1,881,954
LUMBER TRIMMING MACHINE
Filed Sept. 5, 1929  9 Sheets-Sheet 1
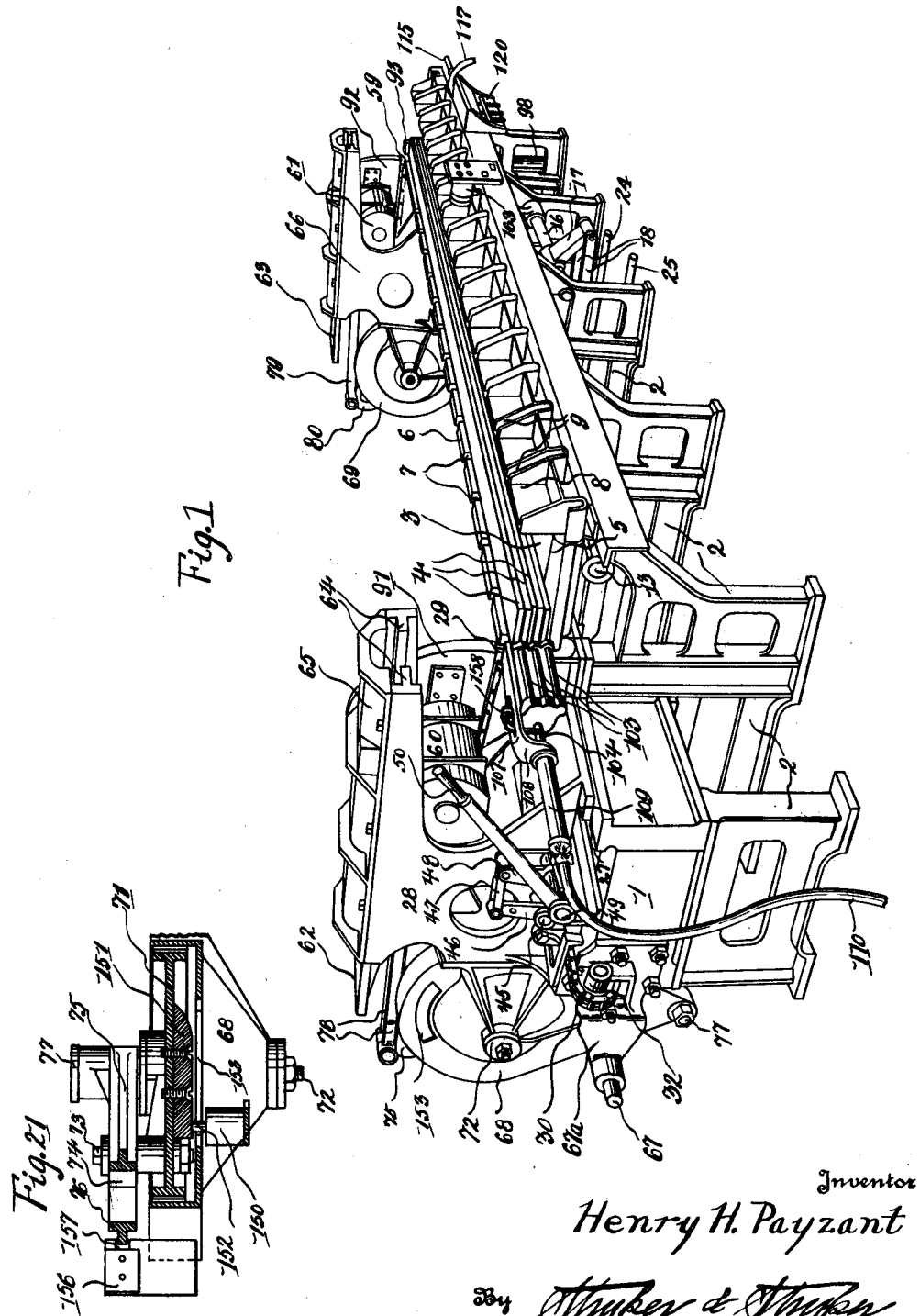
Inventor
Henry H. Payzant
By Stryker & Stryker
Attorneys

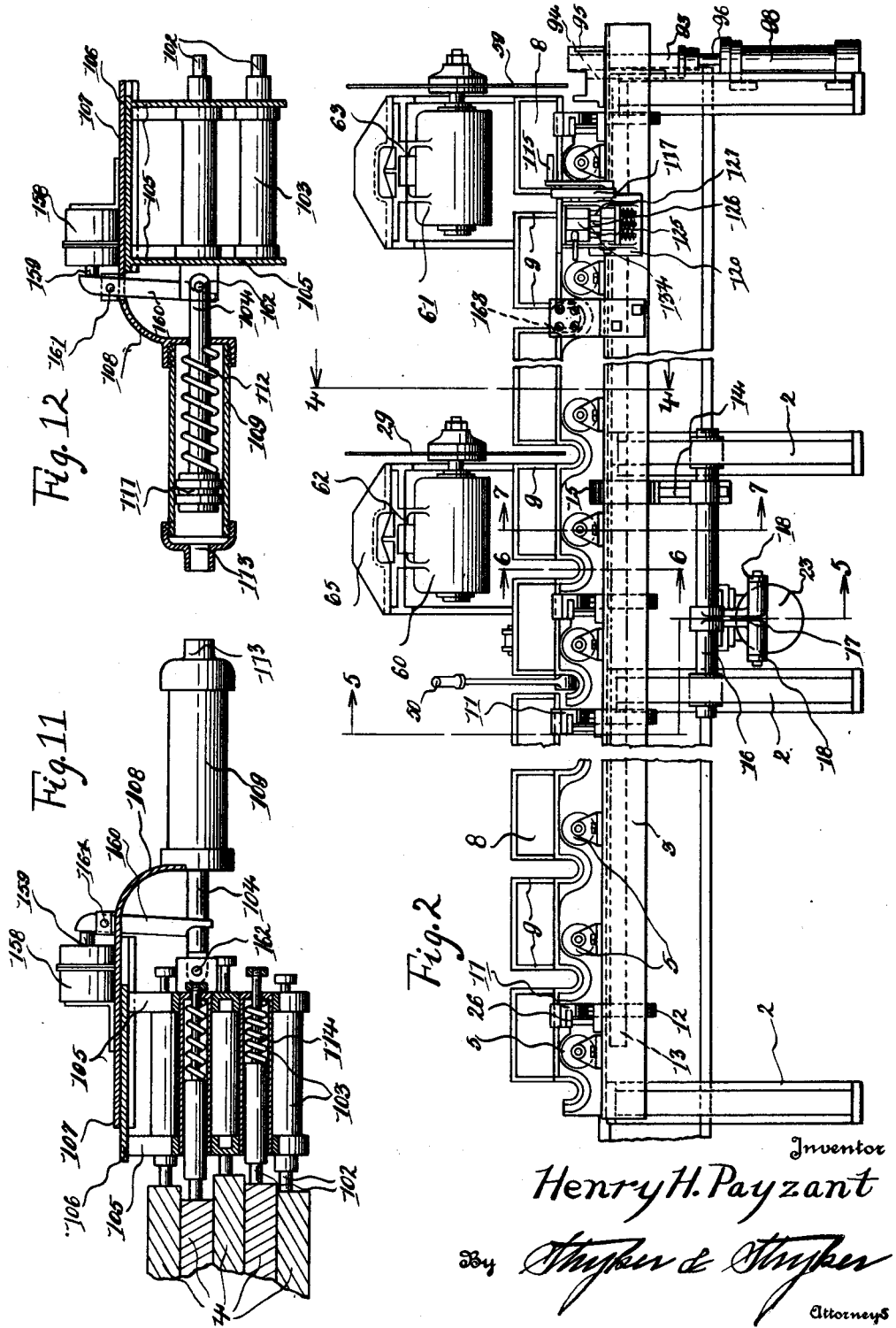

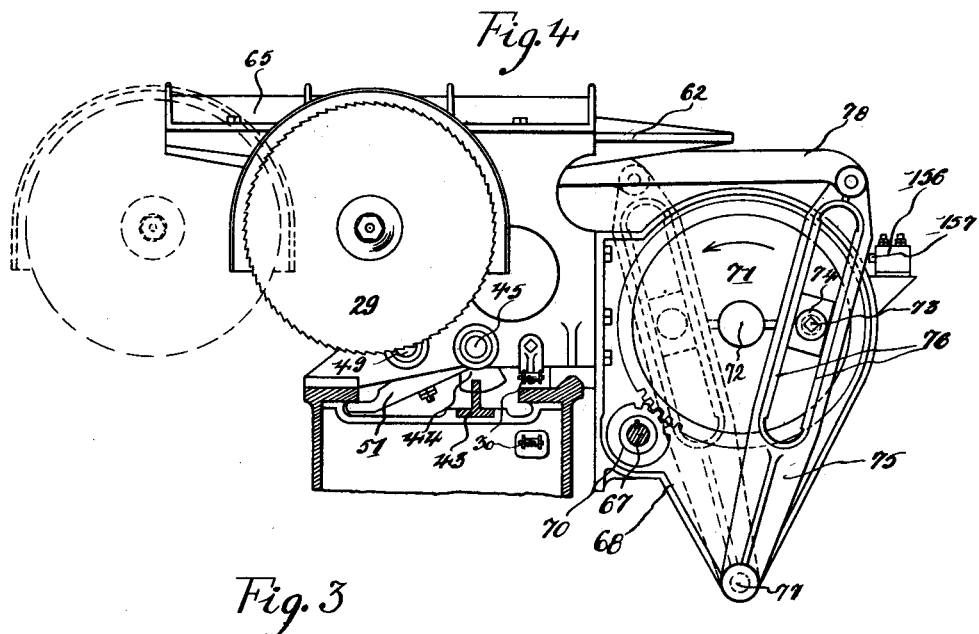
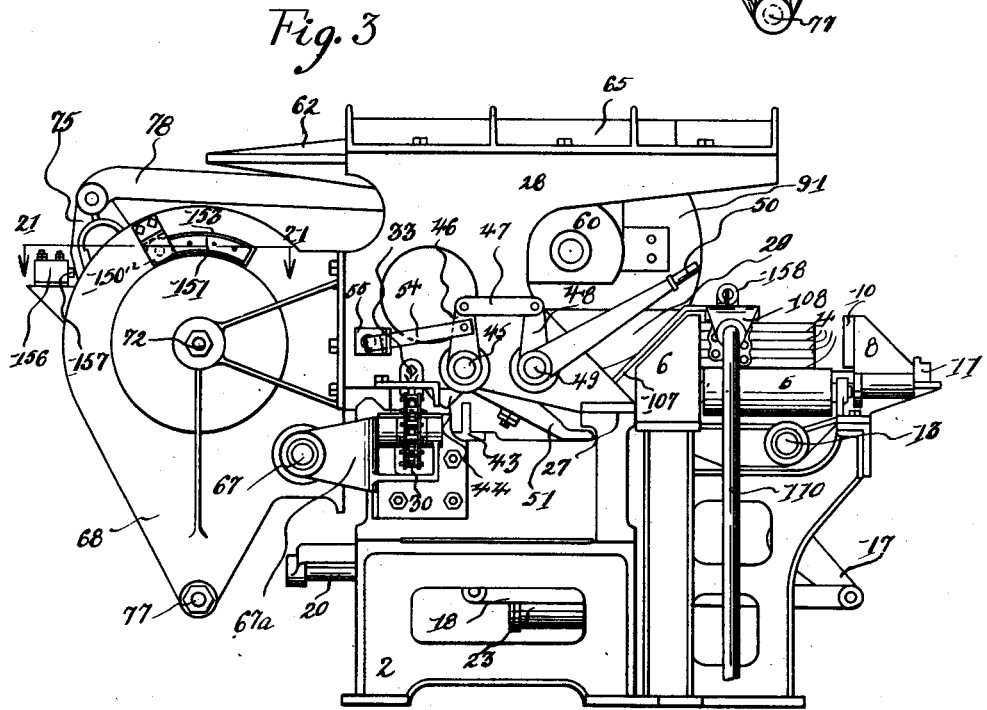

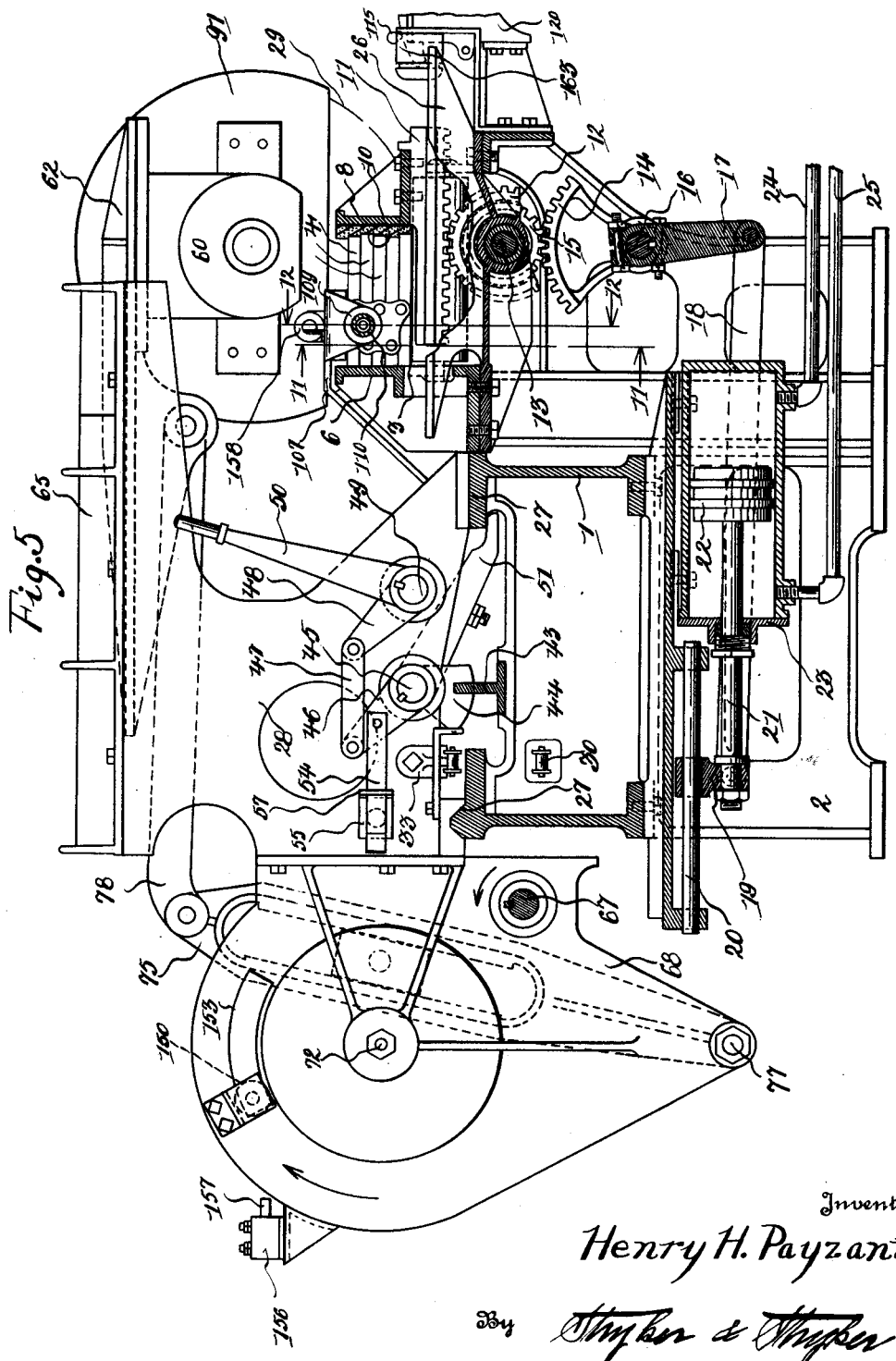

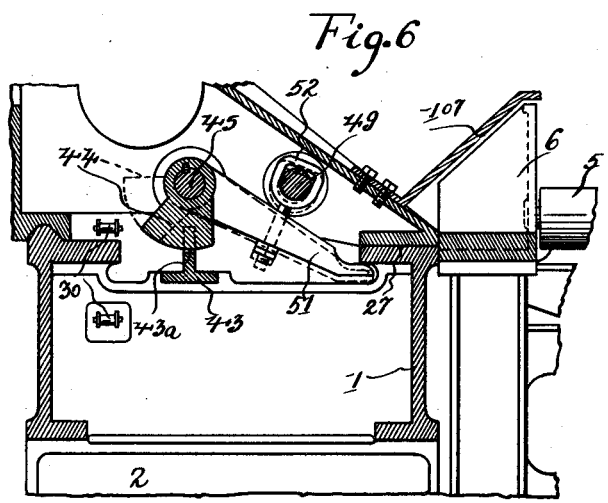
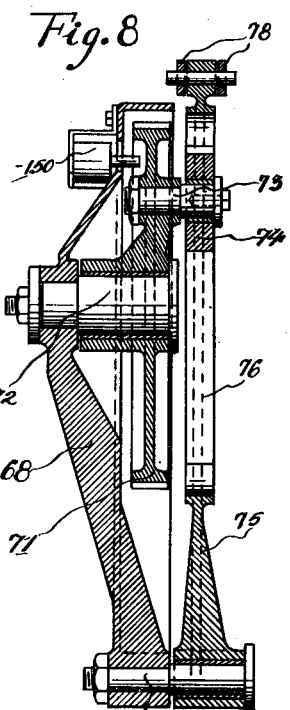
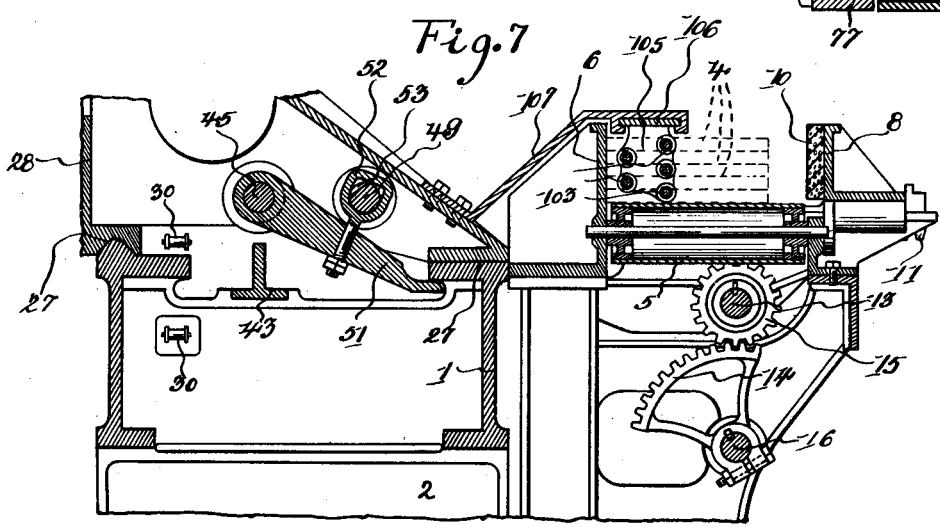
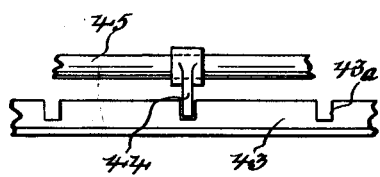

Oct. 11, 1932.  H. H. PAYZANT  1,881,954
LUMBER TRIMMING MACHINE
Filed Sept. 5, 1929   9 Sheets-Sheet 6

Inventor
Henry H. Payzant
By Stryker & Stryker
Attorneys

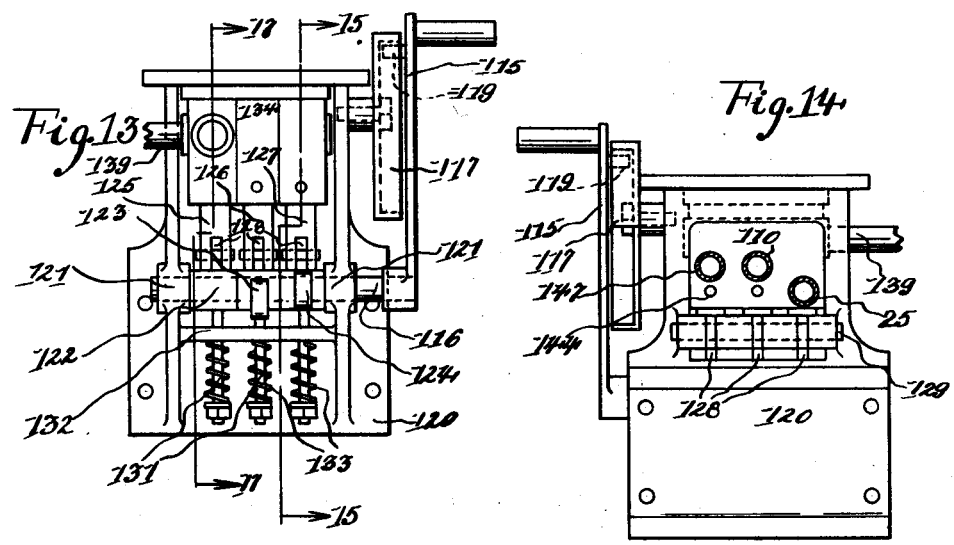
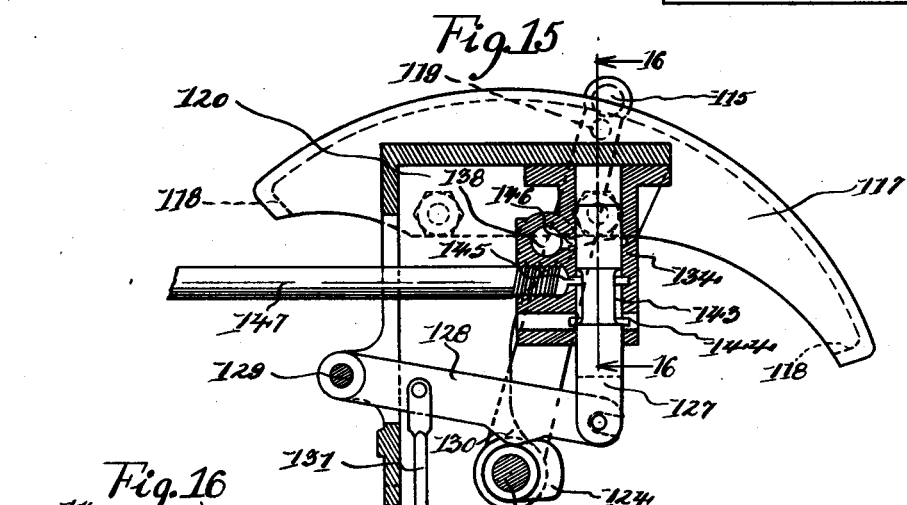
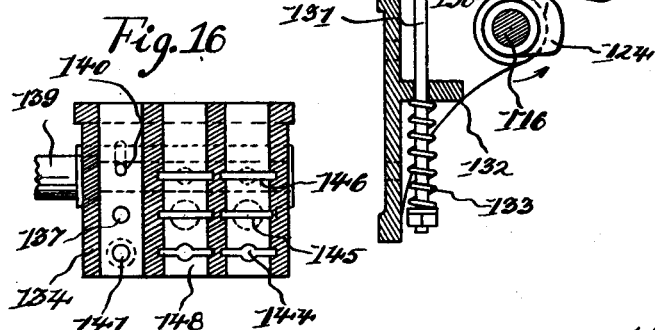

Oct. 11, 1932.   H. H. PAYZANT   1,881,954
LUMBER TRIMMING MACHINE
Filed Sept. 5, 1929   9 Sheets-Sheet 8
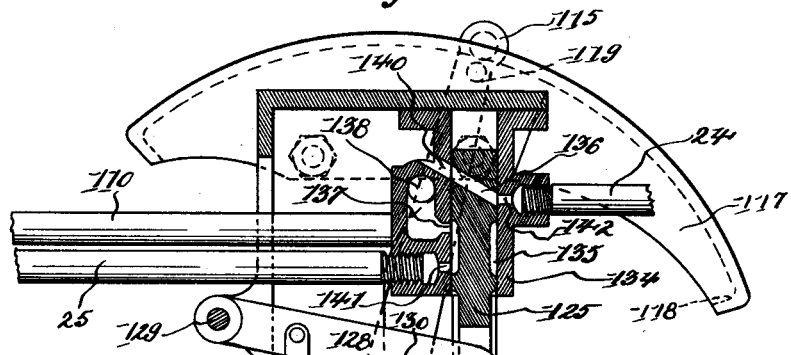
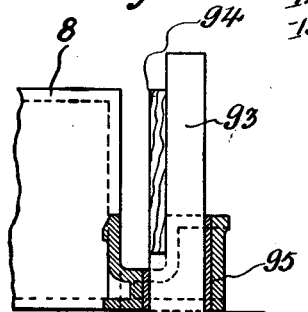
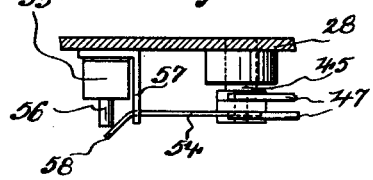
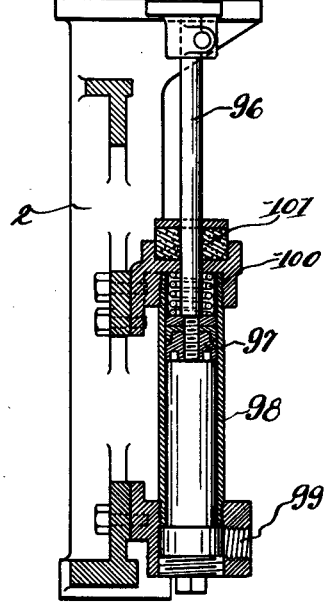
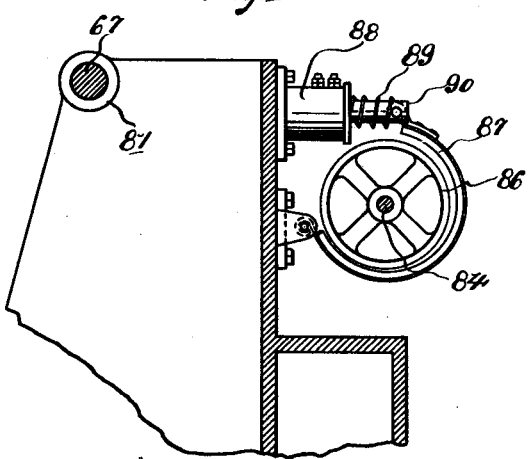
Inventor
Henry H. Payzant
By Stryker & Stryker
Attorneys

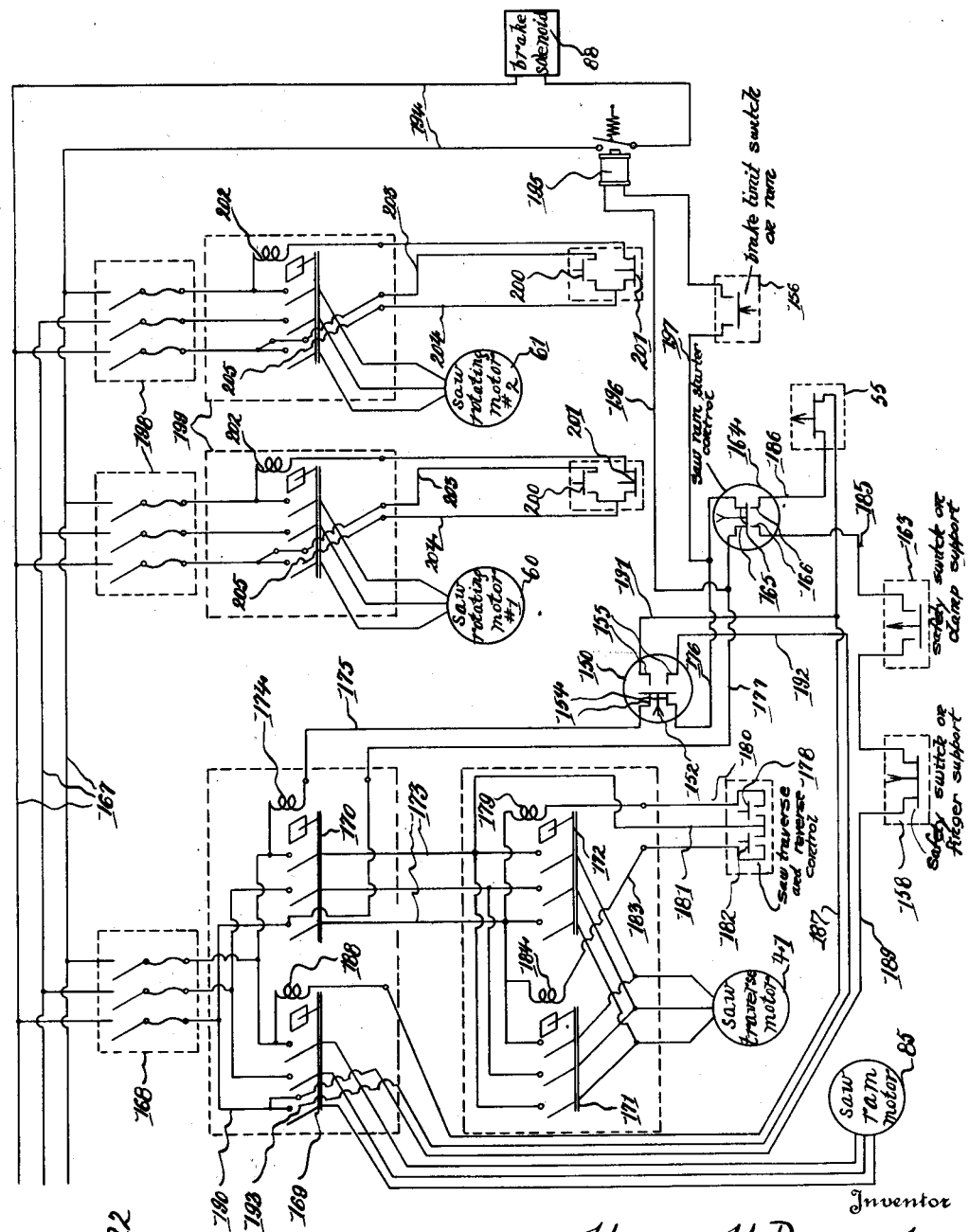

Patented Oct. 11, 1932

1,881,954

UNITED STATES PATENT OFFICE

HENRY H. PAYZANT, OF EVERETT, WASHINGTON, ASSIGNOR TO WEYERHAEUSER TIMBER COMPANY, OF TACOMA, WASHINGTON, A CORPORATION OF WASHINGTON

LUMBER TRIMMING MACHINE

Application filed September 5, 1929. Serial No. 390,525.

This invention relates to a lumber trimming machine of the type known as a rebutting machine.

It is the object of the invention to provide a machine for accurately and rapidly cutting lumber to predetermined lengths with a minimum of hand work. Another object is to provide a machine for straightening lumber simultaneously with the operation of trimming the ends of the same. More particularly, it is my object to provide a machine adapted to simultaneously operate upon a plurality of boards of substantially equal width, to straighten them by gripping pressure applied edgeways and to rebut both ends of all of them while they are being straightened so that the bundle is ready for binding, all without handling of the boards. Other objects are to provide rapidly operable controls and automatic safety devices whereby interference between the elements of the machine is prevented.

Figure 9:
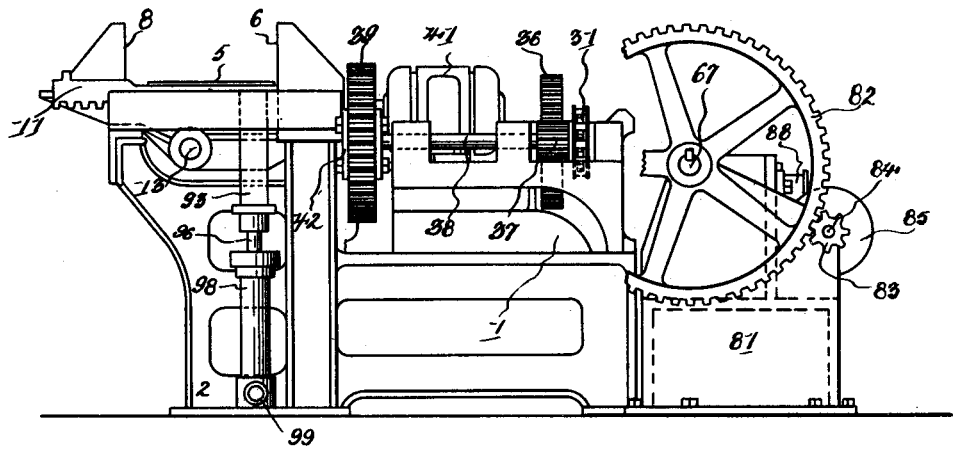
Figure 10:
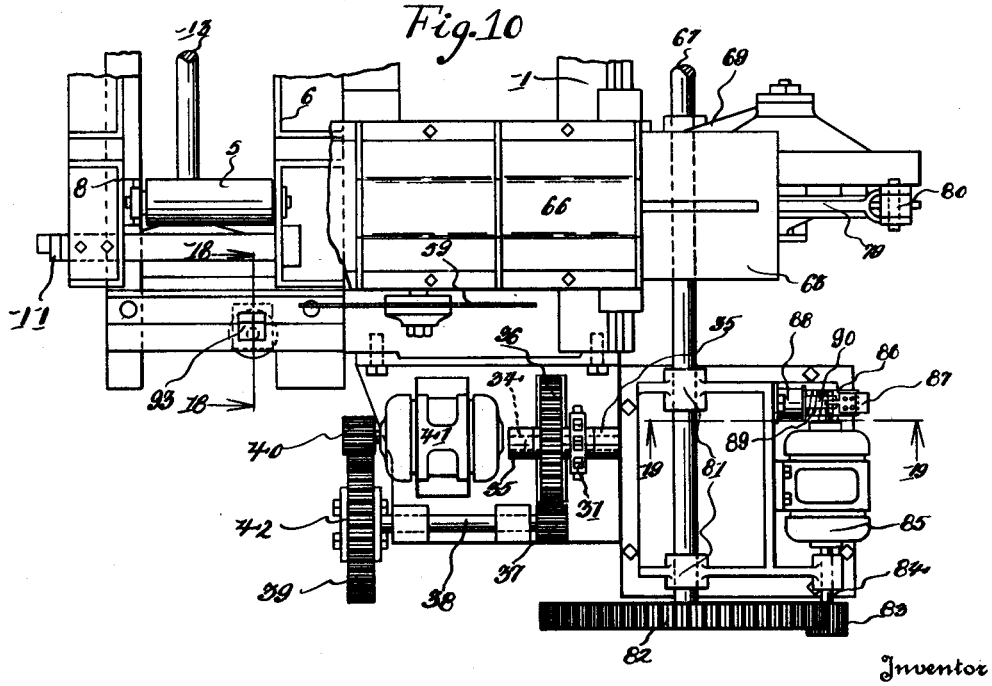

One of the preferred embodiments of my invention is illustrated in the accompanying drawings in which Figure 1 is a perspective view of the machine with certain of the controls removed and with the travelling saw in an extreme position, as for cutting boards of the maximum length; Fig. 2 is a front elevation of the machine with the travelling saw in another position and with the saw guards removed for clearness; Fig. 3 is an end elevation of the machine as viewed from the left of Fig. 2; Fig. 4 is a fragmentary section taken on the line 4—4 of Fig. 2; Fig. 5 is an enlarged section taken on the line 5—5 of Fig. 2; Figs. 6 and 7 are fragmentary sections taken respectively on the lines 6—6 and 7—7 of Fig. 2; Fig. 7a is a fragmentary front view of the saw traverse lock; Fig. 8 is a typical vertical section through one of the saw ram levers and operating gear together with the adjacent portion of the supporting housing; Fig. 9 is a fragmentary end view of the machine as seen from the right of Fig. 2; Fig. 10 is a fragmentary plan view showing the driving mechanism for the saw rams and longitudinal saw traverse; Fig. 11 is a detail section through the lumber end engaging devices and operating cylinder taken on the line 11—11 of Fig. 5; Fig. 12 is a section through said devices and cylinder taken on the line 12—12 of Fig. 5; Fig. 13 is a front elevation of the pneumatic control; Fig. 14 is a back view of the same; Fig. 15 is a section taken on the line 15—15 of Fig. 13; Fig. 16 is a section through the valve housing taken on the line 16—16 of Fig. 15; Fig. 17 is a section taken on the line 17—17 of Fig. 13; Fig. 18 is a fragmentary section through the end stop and operating mechanism taken on the line 18—18 of Fig. 10; Fig. 19 is an elevation of the solenoid brake for the saw ram motor and a section of the support therefor taken on the line 19—19 of Fig. 10; Fig. 20 is a plan view of the safety switch for rendering the saw ram motor inoperative when the saw travelling mechanism is in unlocked position, together with the connections for operating said switch; Fig. 21 is a section through the operating mechanism for the ram limit switch taken on the line 21—21 of Fig. 3 and Fig. 22 is a wiring diagram showing the electrical connections between the elements of the controls for the machine.

My improved machine has a longitudinally extending bed 1 supported upon a series of standards 2. Secured to the front of the bed 1 is a long receiving table 3 for the boards 4 to be trimmed. The machine is designed to receive a number of the boards 4 of substantially equal width and laid face to face one upon another. The top of the table 3 which supports the boards 4 is formed by a series of anti-friction rollers 5 of well known type mounted with their axes parallel to each other and extending transverse the table 3 so as to facilitate longitudinal movement of the boards 4 on said table.

Lumber clamp

As best shown in Fig. 7, the rear ends of the rollers 5 are supported in a stationary clamping jaw 6 extending along the back of the table 3 and formed at intervals with vertical slots 7 to receive a saw. The front face of the stationary jaw 6 is vertical and forms a smooth abutment for the rear edges of the boards 4. Along the front of the table 3 is a movable clamping jaw 8 formed with slots 9 in alignment with the slots 7 in the jaw 6. The gripping face of the jaw 8 is parallel to the opposed face of the jaw 6 and has a pad 10 to engage the edges of the boards 4 and prevent injury thereto. This pad 10 is preferably constructed of rubber adapted to compensate for slight irregularities in the widths of the boards 4, as indicated in Fig. 5.

To open and close the movable jaw 8 while retaining it in parallel relation to the jaw 6, I provide a series of toothed racks 11 (Figs. 2 and 5). These racks are rigidly secured to the jaw 8 in spaced parallel relation to each other and project downward between the rollers 5 to engage pinions 12 fixed on a longitudinal shaft 13. This shaft 13 has suitable bearings in the table 3 and is adapted to be turned by a toothed gear segment 14 engaging a gear 15 secured centrally on the shaft 13. The gear segment 14 is secured to a rock shaft 16, parallel to the shaft 13, having bearings in the adjacent pair of standards 2. A crank arm 17 projects downward from the shaft 16 and is joined by links 18 to a cross head 19 which is slidable on a guide rod 20. A piston rod 21 connects the cross head 19 with a piston 22 in a pneumatic cylinder 23. This cylinder is adapted to be supplied at opposite faces of the piston with compressed air through pipes 24 and 25 (Fig. 5). Parallel rails 26 support the jaw 8 at intervals on the table 3 and suitable flanges along the sides of the rails are arranged to engage in grooves in the sides of the racks 11, as shown in Fig. 2. When the piston 22 is moved to the left, as seen in Fig. 5, it will now be understood that the clamping jaw 8 is moved to closed position upon the edges of the boards 4 and when the piston is actuated in the reverse direction the jaw is opened to release the boards.

Travelling saw

Suitable machined ways 27 extend longitudinally on the bed 1 to slidably support an auxiliary frame 28 carrying a traversable saw 29 (See Figs. 5, 6 and 7). An endless chain 30 also extends longitudinally of the bed 1 and is supported at one end by a drive sprocket 31 (Figs. 9 and 10) and at its other end by an idler sprocket 32 (Figs. 1 and 3). One of the links of the chain 30 is secured by a small bracket 33 to the auxiliary frame 28 so that said frame may be moved along the ways 27 by operating the chain. As best shown in Fig. 10, the drive sprocket 31 is fixed on a short shaft 34 having bearings 35 supported on the bed 1 and also having keyed thereto a toothed gear 36. The gear 36 is adapted to be driven by a pinion 37 on a counter-shaft 38 which is, in turn, driven by a gear 39 meshing with the pinion 40 on the shaft of a drive motor 41. A friction clutch 42 connects the gear 39 to the drive shaft 38, this clutch being of the common type adapted to permit slipping of the gear on the shaft in the event that the driving strain becomes excessive as in case of sudden stoppage of the traversable frame 28. The motor 41 is of the reversible type adapted to rotate the drive sprocket 31 in either direction.

As will now be understood the mechanism above described makes it possible to traverse the saw 29 along the bed 1 so as to cause the saw to register with any pair of the slots 7–9. It is further necessary to insure against the advancing of the saw against the clamping jaws between the slots 7 and 9. To this end, I provide electrical and mechanical interlocking mechanism adapted to insure the retention of the traversing saw in proper position when the advance of the saw is started and during the formation of a cut. This mechanism includes a longitudinally extending rail 43 (Figs. 5, 6, 7 and 7a) having slots 43a extending down from its upper edge at intervals corresponding to the spacing of the slots 7 and 9 in the clamping jaws. A detent 44 has the form of an arcuate blade projecting radially from a shaft 45 on which it is secured. This shaft 45 is secured against longitudinal movement in the frame 28, but is free to turn in suitable bearings in said frame. A crank arm 46 is fixed on an end of the shaft 45 and is connected by a link 47 with a similar crank 48 on a shaft 49. The extremity of the shaft 49 carries an operating lever 50 for simultaneously rocking the shafts 45 and 49. The shaft 49 is journaled in parallel relation to the shaft 45 in the frame 28. A brake arm 51 is pivoted on the shaft 45 at one end and its other end is arranged to frictionally engage the bed 1 beneath one of the ways 27. To operate the arm 51, a yoke 52 is formed to embrace the shaft 49 and said shaft has a flattened portion 53 adapted to coact with the yoke 52 to permit movement of the arm 51 from the full line position shown in Figs. 6 and 7 to the dotted line position shown in Fig. 6, while the arm 51 pivots on the shaft 45.

As shown in Figs. 5 and 20, the crank arm 46 has a pivotal connection with a bar 54 for operating a switch 55. This switch is in circuit with the ram feed motor as hereinafter described and has an operating plunger 56 which is spring pressed, in well known manner, to project and hold the circuit open. The bar 54 fits loosely in a guide bracket 57 secured to the end of the frame 28 and a cam 58 is formed on the end of said bar to actuate the plunger 56. The bar 54 is thrust so as to close the switch 55 when the lever 50 is actuated to move the detent 44 into one of the notches 43a in the rail 43. By the locking mechanism described, movement of the detent 44 into one of the notches 43a prevents longitudinal movement of the frame 28 from a position where the saw is in registry with a pair of the slots 7–9 and simultaneously with the movement to locking position the brake arm 51 is pressed into frictional engagement with the bed 1 to stop longitudinal movement of the frame carrying the traversable saw.

*Saw mountings and ram operating mechanism*

A circular saw 59 is fixed on a projecting end of a supporting arbor and is directly driven by an electric motor 61. The saw 29 is similarly mounted and arranged to be driven by an electric motor 60. The motors 60 and 61 are rigidly suspended from horizontally slidable rams 62 and 63 respectively. The ram 62 is supported on parallel flanges 64 projecting toward each other from opposite sides of the auxiliary frame 28. A rigid cap 65 confines the ram 62 and reinforces the frame to insure accurate, straight line movement of the ram. The ram 63 is similarly supported and confined on an auxiliary frame 66 similar to the frame 28. This frame 66 is fixed near an end of the bed 1 whereas the frame 28 is slidable along said bed. The rams 62 and 63 are thus made slidable in parallel relation to each other and at right angles to the planes of the clamping jaw faces.

To operate the rams 62 and 63 carrying the saws 29 and 59 respectively, a power-driven shaft 67 is arranged to extend in parallel relation to the bed 1 and is journaled in housings 68 and 69 secured to the auxiliary frames 28 and 66, respectively (Figs. 4 and 10). A bearing bracket 67a (Figs. 1 and 2) also supports an end of the shaft 67 on the bed 1. A toothed pinion 70 is keyed to the shaft 67 adjacent to the housing 68 and a similar pinion is fixed on said shaft adjacent to the housing 69. Mounted in the housing 68 is a large gear 71 in mesh with the pinion 70 so as to be rotated thereby, and, as best shown in Fig. 8, the gear 71 is journaled on the stub shaft 72 supported in the housing 68. A crank pin 73 projects from the face of the gear 71 and is journaled in a slide 74 carried by a lever 75. The slide 74 is movable longitudinally in a large slot in the lever 75 between guides 76. A pivot pin 77 projects from the lower extremity of the housing 68 to afford a pivot for the lever 75 while a connecting rod 78 operatively joins the upper end of said lever with the ram 62.

Rotation of the shaft 67 causes the large gear 71 to turn in the direction indicated by arrows in Figs. 4 and 5 so that the crank pin 73, engaging the slide 74, oscillates the lever 75 and imparts reciprocating movement to the ram 62. The ram 63 is similarly moved by a connecting rod 79 and lever 80 which is oscillated by a large gear and pinion in the housing 69 of construction similar to the pinion 70 and gear 71. Traversing of the frame 28 longitudinally on the bed 1 is permitted by revolubly securing the pinion 70 in the housing 68 and allowing the shaft 67 to pass longitudinally through the pinion, the key for driving the pinion being movable in a longitudinally extending slot in the shaft 67. The rams 62 and 63 are thus arranged to simultaneously extend the saws 29 and 59 across the lumber receiving table 3, said rams being driven from the common operating shaft 67.

This shaft 67, as best shown in Figs. 9 and 10, projects at an end of the machine near the frame 66 where it is supported in the bearings 81 and adapted to be driven by a large gear 82 secured to its extremity. The gear 82 is driven by a pinion 83 mounted on a shaft 84 which in turn is directly driven by an electric motor 85. As further shown in Fig. 19, the shaft 84 projects at the opposite side of the motor 85 and has a brake wheel 86 mounted on its projecting end. A brake band 87 is arranged to be actuated by a solenoid 88 to engage the wheel 86 and stop rotation of the motor shaft when the solenoid is energized. A coiled spring 89 normally holds the brake band 87 in released position and at the same time extends the plunger 90 from the solenoid. Suitable guards 91 and 92 are provided for the saws 29 and 59, respectively.

*Lumber adjusting devices*

At one end of the lumber receiving table 3 an extensible and retractile stop 93 is provided. As best shown in Figs. 2, 10 and 18, this stop 93 is located near the ends of the clamping jaws 6 and 8, beyond the saw 59 and in such position that the cut formed by said saw is close to the stop but removed a short distance therefrom so as to trim the ends of lumber pressed against the stop. A facing 94 of wood is preferably mounted on the side of the stop adjacent to the saw. A suitable bearing 95 allows vertical movement of the stop 93 which is connected beneath said bearing to a rod 96 adapted to be actuated by pneumatic means comprising a piston 97 in a cylinder 98. The lower end of the cylinder 98 may be supplied with air under pressure through a pipe connection 99. A spring 100 is confined between the piston 97 and an upper cylinder head and is arranged to retract the stop 93 from the path of the lumber on the table 3. A suitable resilient bumper 101 is provided to receive the impact of the stop when it drops under the action of the spring 100.

As shown in Figs. 1, 5, 7, 11 and 12, devices are provided for engaging the end of each of the boards 4 on the table 3 and for severally moving the boards longitudinally on the table against the stop 93. These end engaging devices comprise a series of spring-pressed fingers 102 mounted in cylindrical guides 103 and adapted to be pressed against the ends of the boards as a group by a pneumatically operated piston rod 104. The several guides 103 are rigidly joined together in parallel relation by webs 105 which project downward from a slidable plate 106 supported on flanges formed on a bracket 107. As shown in Fig. 7, the bracket 107 is bolted to the traversable frame 28 and a projecting arm 108 affords a support for a pneumatic cylinder 109 adapted to be supplied with compressed air from a hose 110. Within the cylinder 109 is a piston 111 and spring 112 which normally urges the piston toward an air inlet 113 communicating with the hose 110. The rod 104 connects the piston 111 with one of the webs 105 carrying the fingers 102. A stout spring 114 is arranged in each of the cylindrical guides 103 to forcibly press the corresponding finger against the end of a board 4. As best shown in Fig. 11, the fingers 102 are spaced vertically from each other so as to severally engage the boards 4. The number of the fingers is made equal to the maximum number of boards which it is desired to trim in one operation. By this arrangement it will be understood that the fingers 102 may be thrust against the ends of the several boards 4 by the pneumatically operated rod 104 and where, as is usually the case, the boards are of somewhat different lengths the springs 114 permit movement of the individual fingers 102 to compensate for the variation in length and permit the positive movement of each board longitudinally on the table against the stop 93.

Pneumatic controls

As shown in Figs. 2 and 13 to 17, inclusive, a single manually operable lever 115 is provided to control the operation of the pneumatic cylinders 23, 98 and 109 for operating the lumber clamp, end stop and end engaging fingers. The lever 115 is secured to the projecting end of a cam shaft 116 and is movable adjacent to a suitable guide quadrant 117. Flanges 118 on the ends of the quadrant 117 are provided to engage a pin 119 projecting from the lever 115 to limit movement of said lever. The quadrant 117 is bolted to the end of a bracket 120 for supporting the control lever 115 and associated valves in convenient position upon the front of the lumber receiving table 3. Bearings 121 support the cam shaft 116 on the bracket 120 and cams 122, 123 and 124 are fixed on the shaft 116 for actuating valve pistons 125, 126 and 127, respectively. The lower ends of these pistons are severally secured to rocker arms 128 pivotally supported upon a rod 129 at the back of the bracket 120 and having cam surfaces 130 held in contact with the several cams by spring actuated rods 131. Openings in a flange 132 projecting from the bracket 120 guide the rods 131, and coiled springs 133 on the lower ends of said rods are suitably arranged to urge them downward with the shaft 129 as a pivot. The forward ends of the arms 128 have pivotal connections with the several valve pistons.

Valve casings 134 are bored vertically to receive the valve pistons. As shown in Fig. 17, the valve piston 125 is formed with an annular passage 135 and also with a transverse passage 136 therethrough. Formed in the casing 134 adjacent to the piston 125 is a fluid supply port 137 adapted to communicate with the passage 135 and also with a common supply passage 138, for the several valves, extending transverse the valve pistons and supplied with compressed air from a pipe 139 (Fig. 16). The casing is also formed with a small exhaust port 140 adapted to communicate with the passage 136 in one position of the valve and with ports 141 and 142 communicating respectively with the pipes 25 and 24.

In Fig. 17 the lever 115 is shown in normal, inoperative position and the valve piston 125 is positioned to place the pipe 24 in communication with the exhaust port 140 through the passage 136 and to admit compressed air from the pipe 139 to the port 137, passage 135, port 141 and pipe 25. Fluid pressure in the pipe 25 forces the piston 22 to the extreme right end of the cylinder 23 (Fig. 5) and holds the clamping jaw 8 in the normal open position shown in Fig. 1. When the clamping jaw 8 is to be closed the lever 115 is moved to the right from the position indicated in Fig. 17 thus causing the cam 122 to raise the arm 128 connected to the valve piston 125 and to move said valve piston to such position that the annular passage 135 connects the supply port 137 with the port 142 communicating with the pipe 24. This pipe transmits the air to the cylinder 23 and causes the clamp 8 to be moved to closed position upon the boards 4, while air from the pipe 25 is released through the open port 141.

As shown in Fig. 15, the valve piston 127 is formed with an annular passage 143 in its periphery and the valve casing adjacent to said piston has an exhaust passage 144 and ports 145 and 146 communicating respectively with a pipe 147 and with the air supply passage 138. The pipe 147 communicates with the connection 99 on the cylinder 98 for operating the end stop 93. As clearly indicated in Fig. 16, the valve casing 134 has a bore 148 to receive the valve piston 126 and ports are formed to communicate with the bore similar to the ports 144, 145 and 146 for the valve piston 127. The piston 126 is formed with an annular passage similar to the passage 143 in the piston 127 and the hose 110 connects with a port communicating with said piston passage like the port 145.

In the normal position of the lever 115, shown in Fig. 15, the valve piston 127 places the pipe 147 in communication with the exhaust port 144 and the piston 126 places the hose 110 in communication with the adjacent exhaust port so that the end stop 93 and fingers 102 are retracted. When the lever 115 is moved to the left from the position shown in Fig. 15 the cam 124 first actuates the piston 127 to place the air supply passage 138 in communication with the pipe 147 and thereby elevate the end stop 93 into the path of boards on the table 3. The elevation of the end stop is immediately followed by the movement of the cam 123 into engagement with the rocker arm connected to the valve piston 126 so that this piston is moved to place the air supply passage 138 in communication with the hose 110 and thereby advance the fingers 102 against the ends of the boards 4. It will be understood that the end stop and fingers 102 are retracted upon the return of the lever 115 to the central position shown in Fig. 15 and said stop and fingers are retained in inoperative position when the lever 115 is moved to the right from the position shown in Fig. 15 as in the operation of the lumber clamp.

*Electric controls and circuits*

As best shown in Figs. 3 and 21, I provide a limit switch 150 mounted on the housing 68 and adapted to be actuated by a cam 151 secured to the face of the large gear 71 for operating one of the saw rams. This switch 150 is provided, as hereinafter particularly described, to stop the saw ram motor 85 and connected saw rams upon the completion of a cut or cycle of operation of the gear 71. An actuating button or plunger 152 for the switch 150 projects through an arcuate slot 153 in the housing 68 to engage the cam 151. The slot 153 also allows access to the cam for making adjustments. The switch 150 is of the common type which is normally held in predetermined position by a spring and the plunger 152 is extended into the path of the cam 151. This cam is so positioned on the gear 71 that it engages and actuates the plunger 152 shortly prior to the completion of the return stroke of the ram or just prior to the reversal of direction of movement of the lever 75. The movable element of the switch 150, as indicated in Fig. 22, is provided with two sets of contacts so as to complete a circuit between a pair of terminals 154 when the plunger 152 is actuated by the cam 151 and to complete the circuit between a pair of contacts 155 when the plunger 152 is released by the cam 151.

Another spring actuated switch 156 (Figs. 3 and 22) is provided with an operating plunger 157 which normally projects so as to be engaged by the lever 75 in the extreme retracted position of the ram 62. The switch 156 is held open only when the lever 75 is in engagement with the plunger 157 and is connected in circuit with the brake solenoid 88 so as to render the brake inoperative when the switch is open.

As best shown in Figs. 11 and 12, a switch 158 is provided with an operating plunger 159 which is normally extended in engagement with one end of a lever 160 having a pivotal support 161 upon the bracket 107 supporting the fingers 102. The lever 160 projects downward through a suitable slot in the bracket 107 and is arranged to be engaged at its lower end by a pin 162 projecting from the piston rod 104. When the fingers 102 are in their normal retracted position the pin 162 engages and holds the lever 160 in position to close the switch 158 and when the fingers 102 are extended the pin 162 releases the lever 160 and the switch 158 is opened by an internal spring in well known manner.

Mounted in the path of the lumber clamping jaw 8 is another safety switch 163 (Figs. 2 and 5). This switch 163 is opened by the movement of the clamping jaw to fully open position and is closed when the jaw is moved toward closed position. As further shown in Fig. 22, a manually operable switch 164 is provided for the saw ram motor. This switch has two pairs of contacts, like the switch 150. One pair of contacts 165 is normally connected by the movable element of the switch which is held in contact with said terminals by a spring and said element is movable manually to complete the circuit between terminals 166.

Suitable current supply wires 167 have branches extending through a three-pole switch 168 to a starter switch 169, of common type, for the saw ram motor 85 and to a starter switch 170 controlling the operation of the saw traverse motor 41. The motor 41, being of the reversible type, has additional starter switches 171 and 172 adapted to reverse the connections between the motor and circuit wires 173 extending to the switch 170.

The coil 174 of the holding magnet for the switch 170 is in circuit with the terminals 154 of the switch 150 and with the terminals 165 of the switch 164, this circuit including wires 175, 176 and 177, so that the switch 170 is normally held in closed position by current flowing in the coil 174. To operate the saw traverse motor 41 in one direction, a push button switch 178 is provided in a circuit including the holding coil 179 for the switch 172 and wires 180 and 181. To operate the traverse motor in the reverse direction a push button switch 182 is arranged to connect the wire 181 with a wire 183 extending to the holding coil 184 for the switch 171.

The terminals 166 of the push button switch 164 for the saw ram motor are connected respectively by a wire 185 with the switch 163 and by a wire 186 with the switch 55. The other contact terminal of the switch 55 is connected by a wire 187 in series with the holding coil 188 for the switch 169 and the normally closed switches 163 and 158 are in series with the wire 185 and a wire 189 extending to a current supply wire 190 at the switch 169. A branch 191 of the wire 187 is connected to one of the terminals 155 of the switch 150 and the other terminal 155 is connected by a wire 192 with a switch closing element 193 on the switch 169 adapted to be electrically connected with the wire 190 when the switch 169 is closed.

The brake solenoid 88 is in a current supply circuit 194 under control of the armature of a relay 195. Branch circuit wires 196 and 197 of the wires 177 and 176, respectively, connect the coil of the relay 195 in series with the switch 156. The saw rotating motors 60 and 61 are connected to branches of the supply wires 167 by manually operable switches 198 and starter switches 199 of well known construction. A manually operable starter button 200 and a stop button 201, also of common type, are provided to control the switches 199 through circuits including the holding coils 202, a supply wire 203 and a third circuit wire 204, the circuit including the latter wire being completed by a contact element 205 of the switch 199.

Operation of electrical controls

It will be understood that when the machine is ready for use the switches 168, 198, 199 and 170 are closed so that the saw rotating motors 60 and 61 are in operation and it is possible to operate either the saw traverse motor 41 or the saw ram motor 85. The saw traverse motor 41 may be operated when the saw rams are retracted to complete the circuit between the terminals 154 of the switch 150, it being understood that the push button starter switch 164 for the saw ram motor is normally in such position that the circuit between the terminals 165 is completed. The saw traverse motor may be operated in one direction by closing the switch 178 and in the reverse direction by closing the switch 182 and will continue to operate as long as said switches are closed.

The saw ram motor cannot be operated until the switch 55 connected to the locking lever 50 is closed by the movement of said lever to such a position that the detent 44 is in one of the notches 43a in the rail 43. It is further necessary in order to operate the saw ram motor that the switches 158 and 163 be closed by the retraction of the fingers 102 and by the movement of the clamping jaw 8 to closed position upon the boards 4. The switches 55, 158 and 163 being closed and the rams being in retracted position so as to close the switch 150 across the terminals 154, the saw ram motor is started by pressing the button switch 164 to complete the circuit between the wires 185 and 186. The circuit thus completed extends from one of the wires 167 through the holding coil 188 and includes wire 187, switch 55, wire 186, switch 164, wire 185, switches 163 and 158 and wires 189 and 190. As soon as movement of the ram 62 starts the limit switch 150 operates to open the circuit between the terminals 154 and to complete the circuit between the terminals 155. This circuit includes wire 190, switch element 193, wire 192, terminals 155 of switch 150, wire 191, wire 187 and holding coil 188. The ram motor continues to operate until the gear 71 has made substantially a complete revolution and the cam 151 opens the circuit between the terminals 155 of the switch 150. The circuit between the wires 175 and 176 is now complete at the terminals 154 and places the coil of the relay 195 in the completed circuit including the wire 197, switch 156, wire 196 and wire 177. This closes the brake solenoid circuit 194 at the relay 195 and applies the brake on the shaft of the saw ram motor 85. The brake continues in operation until the switch 156 is opened by the movement of the lever 75 into engagement with the plunger 157 of the switch 156.

Mechanical operation

To simultaneously straighten and trim a number of boards of substantially equal width, assuming that the several elements of the machine are in the normal positions above described, the boards are placed on the table 3 between the open jaws 6 and 8 where they are supported face to face upon the rollers 5 as indicated in Figs. 1 and 3. The operator places the rear edges of the boards against the stationary jaw 6 and then moves the pneumatic control lever 115 to the left from the position indicated in Fig. 15. This causes the cams 124 and 123 to successively operate the valves admitting compressed air to the cylinder 98 for raising the stop 93 at one end of the table 3 and to the cylinder 109 for advancing the several fingers 102 against the opposite ends of the boards 4. Each board is thereby moved longitudinally against the end stop and is properly placed for the trimming operation. The lever 115 is now moved to its extreme forward position (toward the right from the central position shown in Fig. 17). This renders the cams 123 and 124 inoperative and moves the cam 122 to operative position where it raises the valve piston 125 and allows air to exhaust from the pipe 125 and admits compressed air to the pipe 24 communicating with the opposite end of the cylinder 23. The piston 22 is thus moved to the left, as indicated in Fig. 5, and thereby actuates the clamping jaw 8 to closed position. This jaw and the operating mechanism therefor is of rigid, strong construction and the cylinder 22 is designed to exert sufficient force to straighten any boards which have become warped or bowed longitudinally, the clamping pressure being applied substantially from end to end of the boards edgeways thereof. While the boards are thus being held straight and in proper alignment between the gripping jaws 6 and 8, the operator presses the starter switch 164 for the saw ram motor. This starts the motor 85 so that the shaft 67 is rotated, and, through the connecting pinions and gears in the housings 68 and 69, causes the levers 75 and 80 to be oscillated forward and back to complete the cycle of operation. The levers 75 and 80 impart reciprocating movement to the rams 62 and 63 carrying the saws 29 and 59. These saws, which are simultaneously rotated by the motors 60 and 61 are thus actuated to form smooth cuts in exact parallelism across opposite ends of the boards and the finished end surfaces are accurately perpendicular to the longitudinal edges of the boards by reason of the simultaneous straightening between the long clamping jaws. The rams 62 and 63 are automatically stopped in fully retracted position by the opening of the limit switch 150 under the action of the cam 151 and by the simultaneous operation of the solenoid brake, as hereinbefore described.
To release the trimmed boards the lever 115 is returned to the central position shown in Figs. 15 and 17. This exhausts air from the cylinder 23 through pipe 24, port 142, passage 136 and port 140 and admits air from pipe 139 to pipe 25 through port 137, passage 135 and port 141 with the result that the clamping jaw 8 is positively moved to open position under the action of the piston 22 and connections. The accurately trimmed boards 4 are now ready to be placed in suitable bundles or packages or otherwise handled for shipping or sale. The rollers 5 greatly facilitate the rapid passage of the boards to and from the machine.

When it is desired to readjust the machine to trim boards of different lengths it is only necessary to actuate the lever 50 to move the detent 44 out of engagement with the rail 43 and then to close one of the switches 178 or 182, depending on the direction in which it is desired to move the traversable frame 28. This frame carrying the saw 29 is thus moved longitudinally on the bed 1 by the power-driven chain 30 and when it reaches the desired position, opposite a pair of slots 7—9 in the clamping jaws, the operator merely opens the motor control switch 178 or 182 and actuates the lever 50 to move the detent 44 into the corresponding slot 43a in the rail 43. Movement of the lever to locking position simultaneously brings the brake arm 51 carried by the auxiliary frame 28 into engagement with the bed 1 to stop longitudinal movement of the frame.

My arrangement of the lumber support and clamp adapts the machine to operate equally well upon boards of widely different widths and grouped to form bundles of different thicknesses, adjustments being required only for changing the lengths of the bundles.

In the foregoing specification I have described in detail one form of my invention, as required by statute, but it is to be understood that the invention is not limited to the details of construction herein shown and described and numerous changes will be obvious to those skilled in the art, all within the broad scope of the invention as defined in the appended claims.

Having described my invention what I claim as new and desire to protect by Letters Patent is:

1. In a lumber trimming machine, a support for lumber, clamping jaws extending along said support, said jaws being formed to grip the lumber substantially from end to end of the same, a resilient pad on the gripping face of at least one of said jaws to compensate for irregularities in the lumber held thereby and means for trimming an end of the lumber while the same is in the grip of said jaws.

2. In a lumber trimming machine, a horizontal support for a plurality of pieces of lumber laid face to face and of substantially equal width, clamping jaws extending along opposite sides of said support, said jaws being formed to grip all of said pieces edgeways substantially from end to end of the same, means on said jaws for compensating for variations in the width of the several pieces held thereby and means for trimming both ends of all of said pieces simultaneously, while the same are in the grip of said jaws.

3. A lumber trimming machine comprising, a lumber receiving table adapted to receive a plurality of boards to be trimmed, said boards being of substantially equal width and being laid face to face one upon another, an end stop for said boards near an end of said table, means for severally engaging the opposite ends of said boards to advance them against said stop, means for trimming the ends of said boards and means for gripping said boards on the table during the trimming operation.

4. A lumber trimming machine comprising, a lumber receiving table adapted to receive a plurality of boards to be trimmed, said boards being of substantially equal width and being laid face to face, one upon another, an end stop for said boards near an end of said table, means for severally engaging the opposite ends of said boards to advance them against said stop, means for simultaneously trimming the ends of said boards on said table and means for gripping said boards on the table during the trimming operation comprising jaws adapted to engage the opposite edges of all of said boards and means for forcibly closing said jaws on the boards.

5. A lumber trimming machine comprising a lumber receiving table adapted to receive a plurality of boards to be trimmed, anti-friction means for permitting longitudinal movement of said boards on the table, an end stop for one end of said boards on said table, means for severally engaging the opposite ends of said boards to advance them against said stop, means for trimming the ends of said boards on said table and means for gripping said boards during the trimming operation.

6. In a lumber trimming machine, a support for the lumber to be trimmed, clamping jaws extending along said support to receive the lumber between them, said jaws being formed with pairs of longitudinally spaced slots therein to receive a saw for trimming the lumber, a traversable saw adapted to be placed in registry with any pair of said slots, means for traversing said saw longitudinally of said support, means for imparting relative movement to the jaws and saw to cause said saw to pass through a selected pair of said slots and thereby trim the lumber, means for fixing the location of said saw in registry with said slots and means for initiating traversing movement of said saw controlled by said fixing means.

7. In a lumber trimming machine, a support for the lumber to be trimmed, clamping jaws extending along said support to receive the lumber between them, said jaws being formed with pairs of longitudinally spaced slots therein to receive a saw for trimming the lumber, a traversable saw adapted to be placed in registry with any pair of said slots, means for traversing said saw longitudinally of said support, a second saw adapted to form a cut parallel to the cut of said traversable saw, means for imparting relative movement to said jaws and saws and to cause said traversable saw to pass through a selected pair of said slots and thereby trim both ends of the lumber, means for fixing the location of said traversable saw in registry with said slots and means for initiating the traversing motion of said saw controlled by said fixing means.

8. In a lumber trimming machine, a support for the lumber to be trimmed, clamping jaws extending along said support to receive the lumber between them, said jaws being formed with pairs of longitudinally spaced slots therein to receive a saw for trimming the lumber, a traversable saw adapted to be placed in registry with any pair of said slots, means for traversing said saw longitudinally of said support, a second saw adapted to form a cut parallel to the cut of said traversable saw, means for extending said saws across the lumber on said support, said traversable saw passing through a selected pair of said slots, to simultaneously trim both ends of the lumber, means for fixing the location of said traversable saw in registry with said slots and means for initiating the traversing motion of said saw controlled by said fixing means.

9. In a lumber trimming machine, a support for the lumber to be trimmed, clamping jaws extending along said support to receive the lumber between them, said jaws being formed with longitudinally spaced slots therethrough to receive a saw for trimming the lumber, a longitudinally and transversely movable saw adapted to be moved transversely through any of said slots, means for actuating said saw longitudinally of said support, means for advancing said saw through a selected slot to trim the lumber, means for fixing the location of said saw in registry with said slots and means for initiating traversing movement of said saw controlled by said fixing means.

10. In a lumber trimming machine, a support for the lumber to be trimmed, clamping jaws extending along said support to receive the lumber between them, said jaws being formed with longitudinally spaced slots to receive a saw for trimming the lumber, a longitudinally traversable saw adapted to be placed in registry with any of said slots, means for traversing said saw longitudinally of said support, means for locking said saw in registry with any selected slot, means for advancing said saw through a selected slot to trim the lumber and means for initiating the traversing movement of said saw controlled by said locking means.

11. In a lumber trimming machine, a support for the lumber to be trimmed, clamping jaws extending along said support to receive the lumber between them, said jaws being formed with pairs of longitudinally spaced slots therein to receive a saw for trimming the lumber, a traversable saw adapted to be placed in registry with any pair of said slots, means for imparting relative movement to the jaws and saw to cause said saw to pass through a selected pair of said slots, means for traversing said saw along said support, a fixed locking bar extending in parallel relation to said jaws and a manually operable member having a detent formed to engage said bar at predetermined points corresponding to the slots in said jaw and thereby lock said jaw in registry with said slots.

12. In a lumber trimming machine, a support for lumber to be trimmed, stationary and movable clamping jaws extending substantially from end to end of said support to receive lumber between them, said jaws having flat vertical faces for engaging the lumber, a resilient pad on the vertical face of at least one of said jaws to compensate for variations in the width of pieces of lumber held thereby, horizontal guides for movement of said movable jaw toward said stationary jaw, actuating means for said movable jaw engaging said jaw at a plurality of points and a manual control for said actuating means.

13. A lumber trimming machine comprising, a support for lumber to be trimmed, an end stop for lumber on said support near one end of the same, end engaging devices for the opposite ends of lumber on said support to move the same against said stop, clamping jaws for gripping lumber on said support, a pair of saws movable transversely of the lumber on said support for trimming the same, power-driven actuating means for said stop, end engaging devices, clamping jaws and saws and means adapted to be manipulated to control the operation of said stop, devices, jaws and saws.

14. A lumber trimming machine comprising, a support for lumber to be trimmed, an end stop for lumber on said support near one end of the same, end engaging devices for the opposite ends of lumber on said support to move the same against said stop, clamping jaws for gripping lumber on said support, pneumatic means for actuating said stop, devices and jaws, a pair of saws movable transversely of the lumber on said support for trimming the same, power-driven actuating means for said saws and means adapted to be manipulated to control the operation of said stop, devices, jaws and saws.

15. A lumber cutting machine comprising, a lumber receiving table adapted to receive a plurality of boards to be cut, an end stop for said boards near an end of said table, means for severally engaging the opposite ends of said boards to advance them against said stop, means for cutting said boards and means for gripping said boards on the table during the cutting operation.

16. A lumber cutting machine comprising, a lumber receiving table adapted to receive a plurality of boards to be cut, an end stop for said boards near an end of said table, a plurality of fingers for severally engaging the opposite ends of said boards, pneumatic means for extending said fingers to simultaneously move all of the boards against said stop, means for cutting said boards and means for gripping said boards on the table during the cutting operation.

17. A lumber working machine comprising, a lumber receiving table adapted to receive boards to be cut, anti-friction means permitting longitudinal movement of the boards on said table, an end stop for an end of said boards movable into the path of the same on said table, means for engaging the opposite ends of said boards to advance them against said stop, a support for said last mentioned means movable longitudinally of said table to engage boards of different lengths, means for securing said support in predetermined positions along said table and means for cutting the boards on the table.

18. A lumber working machine comprising, a lumber receiving table adapted to receive a plurality of boards to be cut, an end stop for an end of the boards movable into the path of the same on said table, means for engaging the opposite ends of the boards to advance them against said stop, a support for said last mentioned means movable longitudinally of said table to engage boards of different lengths, a saw for cutting the boards mounted on said support, means for securing said support in predetermined positions along said table and means for actuating said saw to trim an end of said board adjacent to said end engaging means.

19. A lumber working machine comprising, a lumber receiving table adapted to receive a plurality of boards to be cut, an end stop for an end of the boards movable into the path of the same on said table, extensible and retractile means for engaging the opposite ends of the boards to advance them against said stop, a support for said last mentioned means movable longitudinally of said table to engage boards of different lengths, a saw for cutting the boards mounted on said support, means for securing said support in predetermined positions along said table, means for actuating said saw to trim an end of said boards adjacent to said end engaging means, control means for successively extending and retracting said end engaging means and means operable for actuating said saw when said engaging means are retracted.

20. A lumber trimming machine comprising, a receiving table, a pair of saws adapted to be fed across said table for cutting lumber thereon, a motor for feeding said saws across said table, one of said saws being movable longitudinally on said table, a second motor for traversing said saw longitudinally of said table, means for rendering said saw feed motor inoperative when said traverse motor is operative and means for rendering said traverse motor inoperative when said feed motor is operative.

21. A lumber trimming machine comprising, a receiving table, a pair of saws adapted to be fed across said table for cutting lumber thereon, a motor for feeding said saws across said table, one of said saws being movable longitudinally of said table, a second motor for traversing said saw longitudinally of said table, a mechanical lock for preventing longitudinal movement of said saw, an electric switch controlling said saw feeding motor and operatively connected to said mechanical lock for rendering said saw feed motor inoperative when said traverse motor is operative and means for rendering said traverse motor inoperative when said feed motor is operative.

22. A lumber trimming machine comprising, a long lumber receiving table, guides for a pair of longitudinally spaced saws extending transverse said table, saws mounted on said guides, means for extending and retracting said saws on said guides, means for moving one of said guides longitudinally of the table, an electric motor for actuating said extending and retracting means, a second electric motor for actuating said guide moving means, electric control circuits for said motors, an electric switch in the control circuit for said second motor positioned to be actuated when the saws are retracted to render said second motor operative and a switch in another of said control circuits for rendering said first mentioned motor inoperative when said second motor is operative.

23. A lumber trimming machine comprising, a long lumber receiving table, guides for a pair of longitudinally spaced saws extending transverse said table, saws mounted on said guides, means for extending and retracting said saws on said guides, means for moving one of said guides longitudinally of the table, means for clamping lumber on said table, an electric motor for actuating said extending and retracting means, an electric control circuit for said motor and an electric switch in said control circuit to render said motor inoperative when said clamping means are inoperative.

24. A lumber trimming machine comprising, a long lumber receiving table, guides for a pair of longitudinally spaced saws extending transverse said table, saws mounted on said guides, means for extending and retracting said saws on said guides, means for moving one of said guides longitudinally of the table, extensible and retractile means for moving the lumber longitudinally on said table, an electric motor for actuating said saw extending and retracting means, an electric control circuit for said motor and an electric switch in said control circuit positioned to be actuated by said lumber moving means to render said motor inoperative when said lumber moving means are extended.

25. A lumber trimming machine comprising, a receiving table, a saw for trimming an end of lumber on said table, a motor for imparting relative movement between the saw and table for trimming the lumber, a motor for moving said saw longitudinally of the table, means for rendering said first mentioned motor inoperative when said second motor is operative and means for rendering said second motor inoperative when said first motor is operative.

In testimony whereof, I have hereunto signed my name to this specification.

HENRY H. PAYZANT.